Feb. 28, 1967 H. E. SNYDER 3,306,767

METHOD OF APPLYING A RESIN LAMINAR SUBSTRATE TO A SURFACE

Filed Sept. 20, 1962

INVENTOR.
HOWARD E. SNYDER
BY K. W. Thomas
ATTY.

United States Patent Office 3,306,767

Patented Feb. 28, 1967

3,306,767

METHOD OF APPLYING A RESIN LAMINAR SUBSTRATE TO A SURFACE

Howard E. Snyder, Seattle, Wash., assignor to The Boeing Company, Seattle, Wash., a corporation of Delaware Filed Sept. 20, 1962, Ser. No. 225,054
2 Claims. (Cl. 117—102)

This invention relates to a laminable filled resin and to the art of laminating the same as the underlying and supporting structure of a member. More particularly, this invention relates to the art of constructing and maintaining a precisely accurate reproduction of a mirror face by direct and controlled application of supporting layers of resin to the back of a copied reflecting surface exactly conforming to the contour and physical characteristics of the master surface.

The technique of this invention has the outstanding practical advantage that it may be practiced in the manufacture of lightweight replica mirrors, with the result that a mirror of excellent optical precision may be produced without the objectionable feature of needless weight.

Thus, this invention finds its most immediate application to lightweight solar concentrators as a potential source of electrical power for space vehicles. Another practical application for this invention is in economical acoustic reflectors (in which case the reflector is so arranged at corners as to reflect sound waves to other areas, especially other rooms of houses or commercial buildings). Still another application for this invention is in low-cost, high efficiency microwave reflectors, particularly for radar reflectors and television signal concentrators. Yet another application for this invention is in providing durable, economical and dependable receptive surfaces for memory storage of recorded data.

Many techniques have been tried to solve the problem of producing mirror replicas devoid of reflecting surface distortions. Casting of filled resin was one technique tried. In casting resin substrate, however, several difficulties are encountered, one of which is variable and unpredictable thickness of the substrate, especially extra local thickness, resulting in reduced mirror efficiency due to uneven shrinkage of the resin substrate on subsequent curing. Other techniques of creating a filled resin substrate included the method of applying excess resin to the receiving surface, thereafter squeezing the surplus resin from the initially applied area by use of a superimposed form; of foaming the filled resin onto the receiving surface; and of spinning the filled resin onto the receiving surface by means of centrifugal force created by rotating the receiving member. While extra local thickness of the resin substrate is one cause of optical distortion due to shrinkage in using the techniques taught in the prior art, still another cause of shrinkage, in most of the foregoing techniques, is in voids due to entrapped air and gas bubbles and globules, which having different shrinkage characteristics than the resin, also cause, upon curing optical distortions and impairment of mirror efficiency. In endeavoring to control the quality of the resin substrate, some methods approached the problem by control of the rate of flow and temperature of the resin, and by using fillers of different physical characteristics. These approaches proved unsatisfactory in that the resin must, of course, be applied to a curved surface. Therefore, without some means for preventing creep, migration, and slumping of the resin, both during and after application, no quality control of the substrate could be maintained.

Yet another drawback to using the prior methods of preparing a resin substrate was found in the lack of sustained strength of the substrate. The latter characteristic is particularly important in solar concentrators used in space vehicles, in that durability is required in both launch and space environments, each of which is exceedingly hostile to plastics. Environmental analyses of mirror replicas in which the resin substrates were formed according to the prior art indicated that said resin substrates lacked the resilience and structural strength to withstand the tremendous stresses created during rocket launching when vibrational loads are high. The studies also showed that said substrates were seriously affected by temperature gradients, with a consequential and proximate result of proportional loss in proper performance.

Also, it was not possible to produce mirror replicas, using resin substrates created by methods taught in the prior art, of different quality and weight. Very little, if any, design flexibility was afforded, with the result that lighter weight, at a possible cost of loss of some optical quality, or improved optical quality with the gain of some undesired weight, was not taught. Further, where practical, replicas of less optical efficiency, but satisfactory to fill the immediate need, often at a considerable monetary saving, were unavailable. Lightweight mirror replicas using the prior art were expensive, without a compensating improvement in gain of optical efficiency and reduction of weight.

While the filled resin substrate described herein is shown to be a laminar substrate bonded to the back of at least one reflecting surface of a mirror, it is pointed out that in practice, as herein described, a protective bondable substance, usually a vapor-deposited layer of silicon monoxide, often intervenes the filled resin substrate and the actual layer where the reflection occurs. Therefore, for the purpose of this invention, the reflecting member of a mirror includes the layer at which reflection occurs, together with any protective and bondable material adjacent thereto.

For this invention, mirror is defined as a member having the property of reflection of waves or rays, including not only light, but also heat, sound and microwaves.

Substrate is defined as an underlying and supporting structure functioning as the foundation for a given member. A laminar substrate is defined as a substrate comprising bonded successive layers, singly and together underlying and supporting a given member.

Optical efficiency is defined as the percentage of that incident energy falling on the projected area which is focused through a given size aperture placed in the focal plane.

For this invention, "orientation" includes predetermined random arrangement of filler material, as well as arrangement in a common direction.

Thus, an object of this invention is to provide a means of effecting a filled resin laminar substrate onto a bondable surface of a curved member.

Another object of this invention is to provide a means of effecting a laminar substrate of filled resin bonded to the surface of the back of a reflecting member of a mirror.

And another object of this invention is to provide a means of effecting a filled resin laminar substrate onto a bondable surface of the back of a curved reflecting member of a mirror.

Still another object of this invention is to provide a method of effecting a laminar substrate of filled resin, comprising laminating successive layers of said resin between the bondable surfaces of two curved members.

And still another object of this invention is to provide a method of effecting a laminar substrate of filled resin, comprising laminating successive layers of said resin between the bondable surfaces of two reflecting members of a mirror.

Yet another object of this invention is to provide a method of effecting a laminar substrate of filled resin, comprising laminating successive layers of said resin between the bondable surfaces of two curved reflecting members of a mirror.

And yet another object of this invention is to provide for continuously regulating the thickness of individual layers of filled resin laminar substrate, and of continuously inspecting, controlling and eliminating in each said individual layer entrapped air or gas bubbles or globules.

Another object of this invention is to provide for continuously regulating the thickness of individual layers of filled resin laminar substrate bonded to the surface of a curved member, and of continuously inspecting, controlling and eliminating in each said individual layer entrapped air or gas bubbles or globules.

And another object of this invention is to provide for continuously regulating the thickness of individual layers of filled resin laminar substrate bonded to the surface of the back of a reflecting member of a mirror, and of continuously inspecting, controlling and eliminating in each said individual layer entrapped air or gas bubbles or globules.

Still another object of this invention is to provide for continuously regulating the thickness of individual layers of filled resin laminar substrate bonded to the surface of the back of a curved reflecting member of a mirror, and of continuously inspecting, controlling and eliminating in each said individual layer entrapped air or gas bubbles or globules.

And still another object of this invention is to provide for continuously regulating the thickness of individual layers of filled resin laminar substrate bonded to the surfaces between the backs of two curved members of a mirror, and of continuously inspecting, controlling and eliminating in each said individual layer entrapped air or gas bubbles or globules.

Yet another object of this invention is to provide for continuously regulating the thickness of individual layers of filled resin laminar substrate bonded to the surfaces between the backs of two reflecting members of a mirror, and of continuously inspecting, controlling and eliminating in each said individual layer entrapped air or gas bubbles or globules.

And yet another object of this invention is to provide for continuously regulating the thickness of individual layers of filled resin laminar substrate bonded to the surfaces between the backs of two curved reflecting members of a mirror, and of continuously inspecting, controlling and eliminating in each said individual layer entrapped air or gas bubbles or globules.

Another object of this invention is to provide a means of creating a filled resin laminar substrate of such characteristics as to construct and maintain a precisely accurate reproduction of the surface and contour of a copied mirror face.

And another object of this invention is to provide a means of strengthening a filled resin laminar substrate bonded to the surface of the back of a reflecting member of a mirror by orienting fibers, filaments or units of filler material in the direction of applied force in successively applied layers of filled resin.

Still another object of this invention is to provide a means of strengthening a filled resin laminar substrate bonded to the back of a curved reflecting member of a mirror by orienting fibers, filaments or units of filler material in the direction of applied force in successively applied layers of filled resin.

And still another object of this invention is to provide a means of strengthening a filled resin laminar substrate bonded to the surfaces between the backs of two reflecting members of a mirror by orienting fibers, filaments or units of filler material in the direction of applied force in successively applied layers of filled resin.

Yet another object of this invention is to provide a means of strengthening a filled resin laminar substrate bonded to the surfaces between two curved reflecting members of a mirror by orienting fibers, filaments or units of filler material in the direction of applied force in successively applied layers of resin.

And yet another object of this invention is to provide a means of orienting fibers, filaments or units of polarizable filler in successively applied layers of filled resin laminar substrate bonded to the surface of the back of a reflecting member of a mirror, producing thereby a completed resin substrate capable of magnetic field and electric field response.

Another object of this invention is to provide a means of orienting fibers, filaments or units of polarizable filler in successively applied layers of filled resin laminar substrate bonded to the surface of the back of a curved reflecting member of a mirror, producing thereby a completed resin substrate capable of magnetic field and electric field response.

And another object of this invention is to provide a means of orienting fibers, filaments or units of polarizable filler in successively applied layers of filled resin laminar substrate bonded to the surfaces between the backs of two reflecting members of a mirror, producing thereby a resin substrate capable of magnetic field and electric field response.

Still another object of this invention is to provide a means of orienting fibers, filaments or units of polarizable filler in successively applied layers of filled resin laminar substrate bonded to the surfaces between the backs of two curved reflecting members of a mirror, producing thereby a completed resin substrate capable of magnetic field and electric field response.

And still another object of this invention is to provide a means for preventing creep, migration and slumping of filled resin from the surface of a curved member in the process of applying a coating of filled resin thereto.

Yet another object of this invention is to provide a means of producing mirrors of optical quality and efficiency consistently variable to the quantity of filled resin laminar substrate.

And yet another object of this invention is to provide a means of restraining shrinkage and creating selective resilience and structural strength in the rim of a laminar substrate of filled resin.

Another object of this invention is to provide a means of protecting and preserving, during interruption of work, the bondable surface of an exposed layer of filled resin.

And another object of this invention is to provide a eutectically fluid, filled epoxy resin suitable for creating a laminar substrate.

Still another object of this invention is to provide a new and improved product comprising a eutectically fluid, filled epoxy resin laminar substrate bonded to the surface of the back of a reflecting member of a mirror.

And still another object of this invention is to provide a new and improved product comprising a eutectically fluid, filled epoxy resin laminar substrate bonded to the surface of the back of a curved reflecting member of a mirror.

Yet another object of this invention is to provide a new and improved product comprising a eutectically fluid, filled epoxy resin laminar substrate bonded to the surface of the back of a reflecting member of a mirror replica.

Any yet another object of this invention is to provide a new and improved product comprising a uetectically fluid filled epoxy resin laminar substrate bonded to the surface of the back of a curved reflecting member of a mirror replica.

Another object of this invention is to provide a new and improved product comprising a eutectically fluid, filled epoxy resin laminar substrate bonded to the surfaces between the backs of two reflecting members of a mirror.

And another object of this invention is to provide a new and improved product comprising a eutectically fluid, filled epoxy resin laminar substrate bonded to the surfaces between the backs of two curved reflecting members of a mirror.

Still another object of this invention is to provide a new and improved product comprising a eutectically fluid, filled epoxy resin laminar substrate bonded to the surfaces between the backs of two reflecting members of a mirror replica.

And still another object of this invention is to provide a new and improved product comprising a eutectically fluid, filled epoxy resin laminar substrate bonded to the surfaces between the backs of two curved reflecting members of a mirror replica.

Yet another object of this invention is to provide a means of thermo-setting irreversibly a laminar substrate of filled resin.

The foregoing objects are accomplished by using the methods hereinafter set forth.

The operation of the invention and its various embodiments will be fully understood from the following description when read in connection with the accompanying drawings in which.

Figure 1:
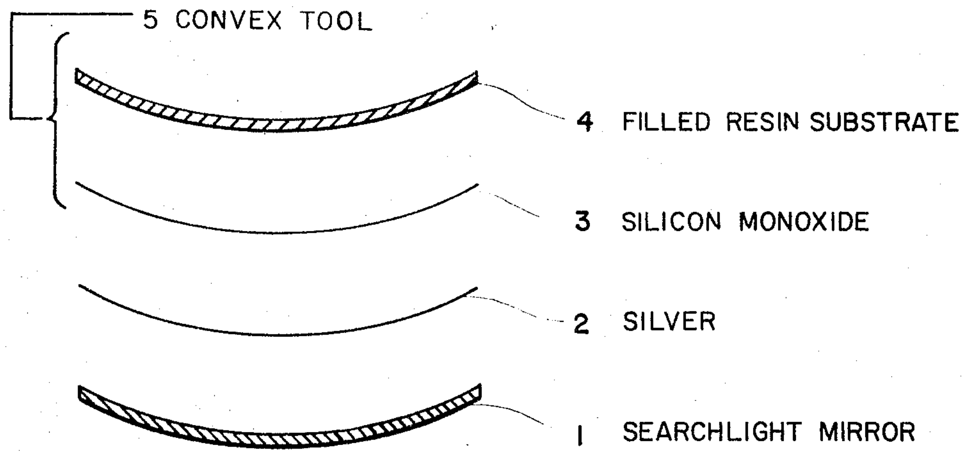
FIG. 1 illustrates a searchlight mirror functioning as a reference optical surface in the construction of a filled resin convex tool.

It is noted that each of the said figures is illustrated by a so-called "exploded" drawing, for the sake of clarity. Thus, in FIG. 1 the completed convex tool 5 comprises the filled resin substrate 4 bonded to a vapor-deposited layer of silicon monoxide 3. In FIG. 2 the convex tool 5 is the inverted convex tool 5 in FIG. 1. Also, in FIG. 2 the completed mirror replica 11 comprises the filled resin substrate 10 bonded to a vapor-deposited layer of silicon monoxide 9 bonded to a vapor-deposited layer of aluminum 8 bonded to another vapor-deposited layer of silicon monoxide 7.

Figure 2:
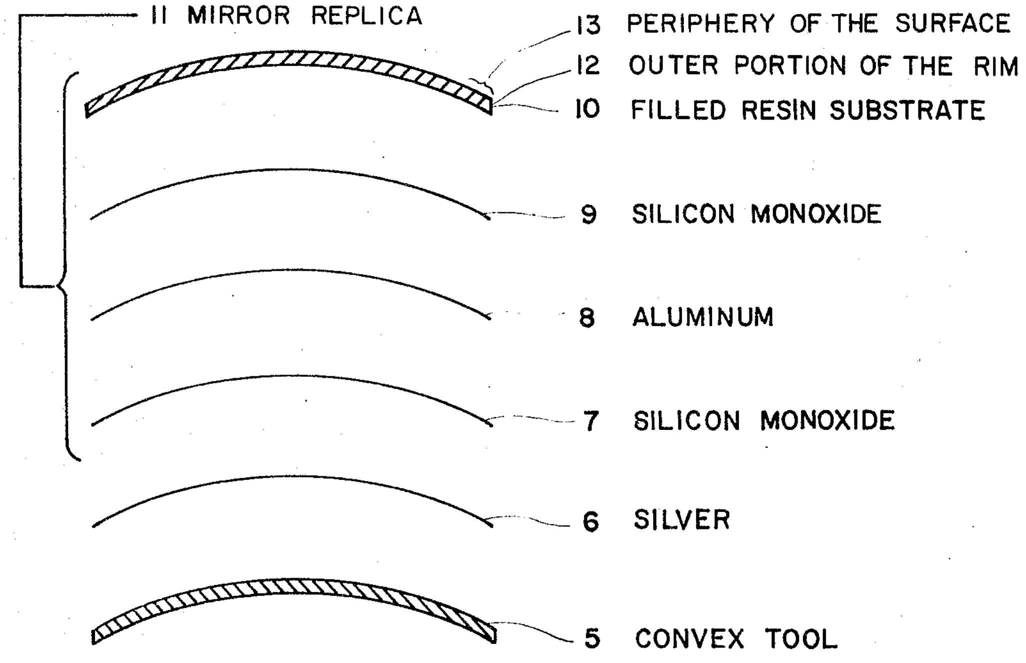
FIG. 2 illustrates a convex tool functioning as a working optical surface in effecting a filled resin substrate bonded to a reflecting member, a replica of the optical surface of the convex tool.

In the prior art it is shown that a mirror replica 11 as in FIG. 2 may be successfully fabricated by using a searchlight mirror 1 FIG. 1 as a reference optical surface. The general process involved two steps: making a convex replica of a concave paraboloidal mirror, and then making a concave replica of the convex tool. In the first step, as in FIG. 1, the surface of the searchlight mirror 1 was coated with suitable parting layers of silver 2, and then, of silicon monoxide 3. The silver film was used to prevent the subsequent silicon monoxide 3 from bonding to the searchlight surface 1. A solid resin substrate 4 was then effected and cured to the silicon monoxide layer 3. After the resin was cured, the convex tool 5 was parted from the searchlight mirror 1 (at the silver interface 2).

The second step, as in FIG. 2, illustrative of the prior art, consisted of coating the said convex tool 5 with a series of vapor-deposited coatings consisting of (in order) silver 6, silicon monoxide 7 and aluminum 8, followed by still another coating of silicon monoxide 9. Onto the last layer of silicon monoxide was effected and cured the substrate of filled resin 10. The mirror replica 11 was then parted from the convex tool 5 (at the silver interface 6).

The method taught by this invention may be used in conjunction with the general process described above in all respects to the point of formation of the resin substrate.

A very critical phase and requirement of mirror fabrication is in the creation of a higher quality resin substrate. According to the teachings of this invention, exceptional and controlled quality of the resin substrate is achieved as follows:

A filled epoxy resin suitable for preparing a laminar substrate is discovered to be:

EXAMPLE

| | Parts |
|---|---|
| A 1,2 epoxy resin which is a polyglycidyl ether of a dihydric phenol | 100 |
| Liquid aromatic diamine curing agent comprising a mixture of: | |

| | Optimum Percent By Weight | Tolerances, Percent By Weight | Parts |
|---|---|---|---|
| Meta-phenylenediamine | 45 | 32–50 | |
| Ortho-phenylenediamine | 10 | up to 18 | 16 |
| 4-chloro-ortho-phenylenediamine | 45 | 34–54 | |
| | 100 | | |

| | Parts |
|---|---|
| Relatively inert non-resin filler material, such as calcium carbonate, graphite, silica or metal powders | 110 |
| Zinc oxide filler | 23 |
| Tolerances established using the above compositions are: | |
| A 1, 2 epoxy resin which is a polyglycidyl ether of a dihydric phenol (Basic reference No.) | 100 |

| | Optimum Percent By Weight | Tolerances, Percent By Weight | Parts |
|---|---|---|---|
| Meta-phenylenediamine | 45 | 32–50 | |
| Ortho-phenylenediamine | 10 | up to 18 | 15–17 |
| 4-chloro-ortho-phenylenediamine | 45 | 34–54 | |
| | 100 | | |

| | Parts |
|---|---|
| Relatively inert non-resin filler material, such as calcium carbonate, graphite, silica or metal powders | 105–115 |
| Zinc oxide filler | 20–26 |

It will be readily seen that the last mentioned example of a filled resin used successfully in this invention is composed of 100% solids. One outstanding advantage in using 100% solid-systems in compounding the filled resin, of course, is that exceptionally little shrinkage of the resin occurs upon gelling and curing, as compared to the usual pronounced shrinkage which results coincident with the use of volatile solvents.

Batches of the last mentioned filled epoxy resin are mixed as follows:

(a) Mix a 1, 2 epoxy resin which is a polyglycidyl ether of a dihydric phenol, inert non-resin filler and zinc oxide until well blended;

(b) Heat to 160° F. in oven for 15 minutes;

(c) Heat liquid aromatic diamine curing agent comprising a mixture of:

| | Optimum Percent By Weight | Tolerances, Percent By Weight |
|---|---|---|
| Meta-phenylenediamine | 45 | 32–50 |
| Ortho-phenylenediamine | 10 | up to 18 |
| 4-chloro-ortho-phenylenediamine | 45 | 34–54 |
| | 100 | |

separately to 160° F.

(d) Mix filled resin, and liquid aromatic diamine curing agent comprising a mixture of:

| | Optimum Percent By Weight | Tolerances, Percent By Weight |
|---|---|---|
| Meta-phenylenediamine | 45 | 32–50 |
| Ortho-phenylenediamine | 10 | up to 18 |
| 4-chloro-ortho-phenylenediamine | 45 | 34–54 |
| | 100 | |

for ten minutes.

(e) Maintain the mixture at 160° F. for about 20 minutes before using, and thereafter during application.

The surface receiving the resin substrate is also warmed to 160° F., and maintained at said temperature. Preferably, the entire member (to which a substrate of resin is applied to the surface) is maintained at a temperature of 160° F. The range of the temperature required for both filled resin and the receiving surface is in the order of 140° to 180° F. The optimum temperature is 160° F.

Then a small batch of filled resin, in proportion to the area of the surface to be coated, is poured onto the center of the mirror. Soft brushes are used to spread the resin outward over the mirror surface in radial strokes. Care is taken to prevent the bristles from touching the surface. The resin must be spread as smooth as possible. The time of applying the resin to the mirror is important. It should be applied when the resin is just beginning to gel. Low viscosity is required for easy spreading; however, if it is too low the resin will slump. Soon after application the viscosity of the resin should increase to prevent run-off. The coating is examined for local thickness and entrapped air and gas bubbles and globules.

Approximately one-half hour is allowed for the coating of filled resin to gel. The resin should feel "tacky" when the next coat is applied. A second layer of filled resin is applied, using the technique for applying the first layer, but with the added feature that after brushing and smoothing the resin, and before allowing the layer to gel, clean dry lengths of silk screen are hand held and stretched over the wet resin, where they are allowed to remain long enough to allow excess resin to seep up through the screen openings. The screen is then raised with a quick sharp motion. The result of this action is to literally lift the heavier concentrations or pools of resin from the surface. Fresh, clean dry lengths of silk screen are applied to the remaining area of the surface in the same way, so that all unevenness is removed and the resultant screen-blotted wet resin film is smooth and uniform in thickness.

Beginning with the third (to seventh) coat and continuing with every alternate or third coat up to 10 (+5, −2), there should be an edge bond formed as follows: The outer edges of strips of glass cloth are trimmed, leaving strips about six ±1 inches wide. About one-half of the width of the glass cloth strip is draped onto the periphery of the surface 13 (FIG. 2) of the last applied layer of filled resin. The remainder of said strip is conformed to the outer portion of the rim 12 (FIG. 2) of the resin substrate. It can be recognized immediately that a definite advantage results, since the rim of the resin substrate specifically is given protective resilient properties and structural strength, thus affording a retention of plastic rigidity in the inner area of the circuit of resin substrate while causing the outer edge of the circle of resin substrate to exhibit characteristics of elasticity sufficient to permit the edge of the replica to endure considerable stress without permanent damage, while simultaneously protecting the inner resin substrate. Overlapping the glass cloth gives the additional benefit of restraining shrinkage. Another benefit is in providing a layer of non-super-imposed fibers, thus affording added laminar strength.

It is pointed out that interlaying the aforesaid fiber glass cloth is not begun until after the third lamination of filled resin in order to avoid possible print-through of the pattern of the fiber glass cloth onto the optical surface of the reflecting member. In subsequent lamination of the filled resin it is also found that any substrate defect of unevenness resulting from interlayed fiber glass cloth is minimized by laminating several additional layers of filled resin prior to resuming interlaying of fiber glass cloth.

Using the above-described technique of initial application of filled resin, brushing, silk-screening, examination and gelling for each successive coating, the desired number of laminations is achieved. The optimum number of layers is dictated by optical quality.

Thereafter, the entire structure is cured in an oven at 250° F. ±25° for about two hours and 300° F. (+30°) for about four hours.

It will be recognized that the range of temperature required using this technique substantially reduces the pot life of the filled resin. However, it will also be recognized that the advantages derived in using maintained and rather high temperatures far outweigh a shortened pot life obtained in the barter. One exceptional advantage thus achieved in using a filled resin cured by using the temperature range taught in the preceding process is in thermosetting the finished plastic irreversibly, thereby permitting use of the plastic in environments of high temperature.

Several significant advantages are obtained by building the resin substrate in laminar form. One advantage is that the thickness of each individual layer of resin applied is limited to approximately 0.002″ (two-thousandths of an inch). Another advantage is a natural consequence of the last mentioned benefit, in that the total resin substrate thickness can be selected and predicted as a funcion of the number of layers of resin that are applied. Yet another advantage is that heavy local concentrations of resin can be virtually eliminated by inspection, and control through brushing and silk-screening. Still another advantage is that the occurrence of voids, due to differential shrinkage between the resin, on one hand, and entrapped air and gas bubbles or globules, on the other, will obviously be limited to small magnitude, and on detection can be filled and smoothed over. And still another advantage is that the small quantity of resin used during each application (together with heating the resin and the receiving surface during and after application) substantially minimizes creep, migration and slumping of the resin.

Test results indicate that while the laminar technique just taught produces a surface of distinctly higher quality adjacent to the silicon monoxide coating than the techniques taught in the prior art, the optical quality of the finished mirror replica is proportionally variable, within the range shown, to the total laminations of resin substrate. For example, experimentation revealed that the minimum number of layers of filled resin required to give satisfactory optical efficiency is ten. That optical efficiency is variable to the total number of layers of resin substrate is shown by the following test results:

| Number of layers of resin: | Resulting optical efficiency, percent |
|---|---|
| 10 | 75 |
| 15 | 81 |
| 20 | 86 |
| 25 | 91 |
| 30 | 94 |

A number of layers of resin in excess of thirty, of course, may be applied. Experimental findings, however, demonstrate a sharp drop in corresponding improvement of optical efficiency after application of thirty layers of resin. Several factors must be considered in choosing the total number of laminations, such as optical efficiency required, versus increased weight and cost resulting from additional coatings of resin substrate. One advantage, nevertheless, is that mirror replicas of selective and predictable optical quality may be produced using the described laminar technique. Another advantage, related to the last, is that mirror replicas of assorted weights matched to environmental requirements, are possible and practical. A third advantage is in elimination of surplus expenditures for mirror replicas of greater optical efficiency than needed.

Since the resin substrate is formed by laying up successive layers of resin, according to the teachings of the method of this invention, increased strength of the resin substrate may be achieved as follows: In one resin layer fibers, filaments or units of filler are selectively oriented in a desired direction to react to application of force or stress. In successive layers of resin fibers, filaments or units of filler are also selectively oriented in a desired direction, either the same or a different direction than in the preceding resin layer. Full benefit of strengthening by use of lamination is thereby achieved.

It should also be pointed out that even without selective orientation of direction of filler material, it is believed that some additional advantage of inherent strength results from using a laminated resin substrate. Careful examination of the resin substrate formed by using the technique taugh herein shows that definite and distinct layers of resin constitute the substrate, indicating the formation of some amount, at least, of "skin," which, of course, gives a material produced by successive layers (even of a similar nature and containing unoriented filler) additional strength.

Thus, since fibers, filaments or units of filler material may be oriented in a definite direction in a laminar substrate, orientation of polarizable filler in the coatings of resin applied produces a resin substrate of such characteristics that the completed resin substrate is capable of magnetic field and electric field response. Practical applications of this last mentioned teaching are apparent when it is recalled that the principal uses of lightweight mirror replicas occur at present in space environments.

Another method this invention teaches is in proctection of an exposed coating or layer of resin substrate. Very often it is necessary to interrupt the laying up of a resin substrate, especially for over-night periods. It is found, however, that when the last applied resin layer is left exposed, a considerable "skin" develops on the unprotected surface. When further lamination is thereafter attempted, poor bonding of the subsequently applied filled resin to the "skin" results. While the "skin" may be made bondable through careful abrasion of the surface of the "skin," this step is not only quite costly, but is also tedious and prohibitively time consuming as well. Prevention of the formation of a glazed "skin," therefore, is needed, and is accomplished satisfactorily by applying to the last exposed layer, at the time of interruption, a coating of plain resin (sans catalyst). When lamination is resumed, the protective resin is easily removed by solvent. The readily bondable surface of the last-applied layer of resin substrate is thereby unharmed.

It is noted that a filled resin substrate may be laminated to members having different shapes and surface characteristics. The requirements for laminating a filled resin to a flat surface are not as exacting as the requirements for effecting lamination to a curved surface. A further distinction is noted in the very exact requirements of laminating a filled resin as the substrate for the reflecting member of a mirror, particularly if the shape of the mirror is either convex or concave. To a flat surface a filled resin laminar substrate may be established with little regard to heating the receiving member and the said resin, since on a flat surface, of course, creep, migration and slumping do not pose a serious problem. On a curved member, however, the applied filled resin is subject immediately to undesired flow, so that the pot life of the resin becomes a critical factor. And where the curved member is a reflecting surface to the back of which the filled resin is applied, the laminated resin must accurately conform to the contour and physical characteristics of the reflecting surface, otherwise optical efficiency is impaired. Migration of fibers, filaments and units of filler material is especially important when the laminated surface is curved, and even more so when the laminated surface is the back of the face of a curved reflecting member.

It is also noted that the techniques taught by this invention are applicable not only to establishing a filled resin laminar substrate designed to function as the underlying and supporting structure of a single reflecting member, but also as the foundation for a plurality of reflecting members. Thus, in using the methods taught by this invention it is possible to effect a filled resin laminar substrate common to two or more reflecting members of either similar or assorted configurations.

One example of a method of effecting a filled resin laminar substrate common to two reflecting members is the technique of continuing the laminations of filled resin onto the bondable surface of the back of a certain reflecting member to achieve the desired thickness of the substrate, thereafter to the outer layer of the exposed substrate effecting a second reflecting member using the technique hereinbefore described for effecting a single reflecting member. The second reflecting member, of course, will have a contour similar to the original reflecting member. Thus, if the original reflecting member is concave, the second reflecting member, using this technique, will be convex.

Another example of a method of effecting a filled resin laminar substrate common to two or more reflecting members is in effecting a substrate to separate reflecting members, thereafter bonding the incompletely cured outer substrates of the separate reflecting members together, to form a single filled resin laminar substrate.

In using the technique taught by this invention, it is emphasized that the combination of using a specific filled epoxy resin and of laminating the said filled epoxy resin as the substrate bonded to the surface of the back of a reflecting member results in a product having distinctive internal and external physical characteristics, as well as distinguishing capabilities. Thus, in short, a new and improved product is derived from the aforesaid combination.

It is to be understood that the above description is for the purpose of illustration and not by way of limitation and that changes and modifications may be made therein without departing from the spirit and scope of the invention.

Having thus described my invention, what I desire to protect by Letters Patent is:

I claim:

1. A method of applying a resin laminar substrate to a pressure sensitive surface comprising the steps of:
   (a) applying resin in a substantially liquid state to said surface to form a layer of resin thereon;
   (b) laying screen material having means defining spaced openings therein over said layer of resin;
   (c) allowing any excess resin creating areas of excess thickness in said layer of resin to seep through the openings in said screen material; and
   (d) removing the screen material and any excess resin thereon from said layer of resin.

2. A method of applying a filled epoxy resin laminar substrate to a substantially smooth, convex surface having a substantially circular peripheral edge, comprising the steps of:
   (a) applying a first quantity of filled epoxy resin in a substantially liquid state to said surface to form a first layer of resin thereon;
   (b) allowing said first layer of resin to gel;
   (c) applying a second quantity of filled epoxy resin in a substantially liquid state over said first layer of resin to form a second layer of resin;
   (d) laying silk screen material having means defining spaced openings therein over said second layer of resin;
   (e) allowing any excess resin creating areas of excess thickness in said second layer of resin to seep through the openings in siad screen material; and
   (f) removing the silk screen material and any excess resin thereon from said second layer of resin.

(References on following page)

References Cited by the Examiner

UNITED STATES PATENTS

| | | | |
|---|---|---|---|
| 2,476,937 | 7/1949 | White | 117—6 |
| 2,551,966 | 5/1951 | Pierce | 117—64 |
| 2,603,574 | 7/1952 | Holmes | 117—6 |
| 2,756,171 | 7/1956 | Thomas | 161—162 |
| 2,919,218 | 12/1959 | LeMay | 156—212 |
| 2,927,042 | 3/1960 | Hall et al. | 117—38 |
| 2,937,955 | 5/1960 | Loomer | 117—38 |
| 2,940,951 | 6/1960 | Ruskin | 260—37 |
| 2,967,843 | 1/1961 | Delmonte et al. | 260—37 |
| 2,972,782 | 2/1961 | Archibald | 88—105 |
| 2,977,264 | 3/1961 | Shapero et al. | 161—162 |
| 3,010,153 | 11/1961 | Bittner | 117—161 |

| | | | |
|---|---|---|---|
| 3,026,232 | 3/1962 | Finch | 156—212 |
| 3,165,265 | 1/1965 | Clause | 88—105 |
| 3,187,444 | 6/1965 | Lehmann et al. | 260—37 |

OTHER REFERENCES

"Silicon Monoxide Protected Front-Surface Mirrors," Hass and Scott, Journal of the Optical Society of America, 39, No. 2, February 1949 (pages 179–184).

ALFRED L. LEAVITT, *Primary Examiner.*

EARL M. BERGERT, *Examiner.*

W. J. VAN BALEN, A. H. ROSENSTEIN,
*Assistant Examiners.*